Dec. 16, 1969    J. R. NAUMANN    3,484,076
SOLENOID VALVE WITH O-RING SEAT AND BELL SPRING BIAS
Filed June 13, 1968
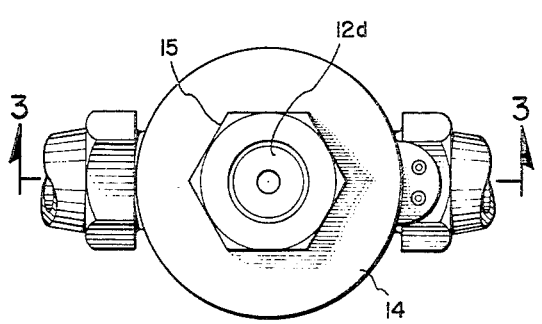
FIG. 2
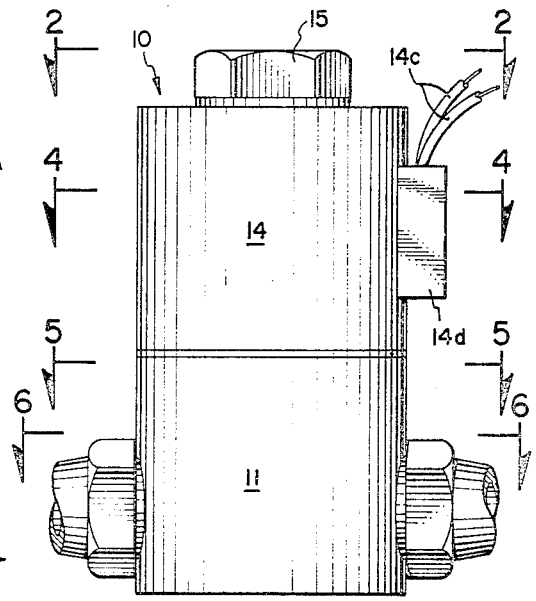
FIG. 1
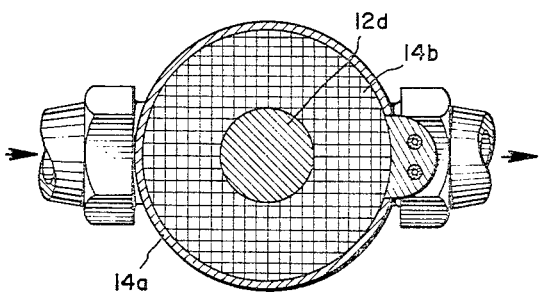
FIG. 4
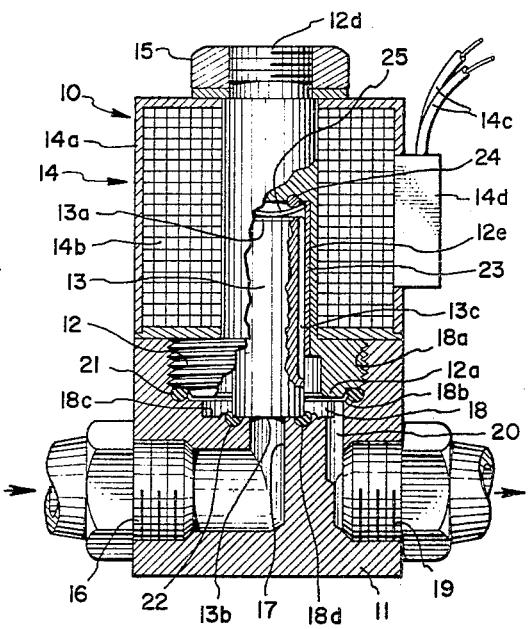
FIG. 3
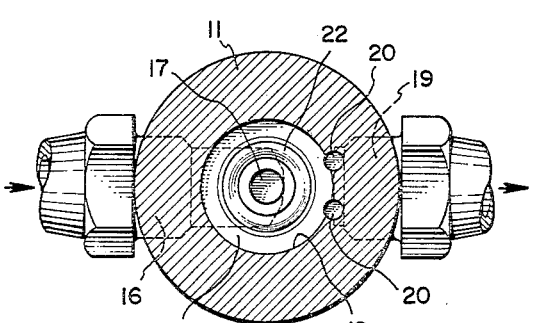
FIG. 5
FIG. 6
INVENTOR:
JOHN R. NAUMANN
BY:
ATTORNEY United States Patent Office 3,484,076
Patented Dec. 16, 1969

3,484,076
SOLENOID VALVE WITH O-RING SEAT AND BELL SPRING BIAS
John R. Naumann, 40 South First West, P.O. Box 559, Brigham City, Utah 84302
Filed June 13, 1968, Ser. No. 736,724
Int. Cl. F16k 31/02
U.S. Cl. 251—141                                    5 Claims

ABSTRACT OF THE DISCLOSURE

A solenoid operated valve wherein a bell spring is used to bias a valve plunger having a valve head thereon to its closed position against an O-ring seat that is partially shielded against direct impinging contact with the fluid being controlled and that does not present an obstruction to gas flow.

Brief description

In the handling of fluids, it is frequently desirable to to have a valve that can be rapidly operated to positively open or close a flow passage and that can be readily disassembled to facilitate repair or changing of the biasing force applied to close the valve. Naturally, it is also desirable that such a valve will be constructed to have a long life, with those parts most subject to wear the corrosion being positioned out of the direct impinging flow path of the fluid.

Many solenoid valves have been developed in the past to provide rapid operation and positive opening and closing, but those are usually difficult to construct and chatter, i.e. rapid reciprocating movement of their plungers and valve heads, frequently results during their use. This chatter may be due to a weakening of the biasing spring used and to the long travel required of the plunger and valve head when the valve head is moved between its open and closed positions.

It is a principal object of the present invention to provide a solenoid valve having a plunger with a valve head formed thereon that is subjected to minimum travel between the valve open and the valve closed positions and that has a spring arranged and constructed to have a long life and to be easily replaced, should such replacement be necessary.

Other objects are to provide such a valve, wherein the valve biasing force can be easily changed; the valve head can be constructed of material that is resistant to the corrosive effects of the material being handled; and a resilient easily positioned, valve seat that cooperates with the valve head to provide a complete seal, even without accurate machining of the valve head, is positioned such that it is out of the direct impinging flow path of fluid through the valve and is, therefore, assured of a longer useful life.

A principal feature of the invention is the bell spring that is arranged to act on one end of a plunger, which has a valve head formed on the other end to cooperate with an O-ring valve seat that surrounds the inlet opening to the valve. When the valve is closed the fluid being controlled acts against the end of the plunger serving as a valve head and when the valve is opened the fluid impinges against the end of the plunger to be deflected to one or more outlet ports.

Additional objects and features of the invention will become apparent from the following detailed description and drawing, disclosing what is presently contemplated as being the best form of the invention.

The drawing

FIG. 1 is a side elevation view of the valve of the invention;
FIG. 2, a top plan view;
FIG. 3, a vertical section, taken on the line 3—3 of FIG. 2;
FIG. 4, a horizontal section, taken on the line 4—4 of FIG. 2; and
FIGS. 5 and 6, similar views taken on the line 5—5 and 6—6, respectively, of FIG. 2.

Detailed description

Referring now to the drawing:

In the illustrated preferred embodiment, the valve of the invention, shown generally at 10, includes a housing 11, a bushing 12, a plunger 13, a solenoid 14 and a retainer nut 15.

The base, which may have any desired exterior configuration, has an inlet port 16, entering at one side thereof and intersecting a vertical inlet passage 17 that extends upwardly to a chamber 18. An outlet port 19, formed through an opposite side of the valve housing, intercepts a pair of discharge passages 20 that extend downwardly from chamber 18, a spaced distance from the upwardly extending passage 17.

Chamber 18 is formed in the upper end of base 11 and includes an enlarged threaded portion 18a, adapted to receive the bushing 12, a shoulder 18b adapted to receive an O-ring seal 21 made of neoprene or other suitable resilient material, and a bottom 18c. A groove 18d in bottom 18c surrounds the upper end of passage 16 to receive an O-ring valve seat 22, also made of neoprene or other suitable resilient material, and a portion of the chamber bottom, outside of the O-ring seat, is upset, i.e. forced up and partially over the O-ring seat to secure it firmly in place.

The discharge passages 20 extend upwardly through the bottom 18c, between the valve seat 22 and the seal 21.

Bushing 12, which is of electrically conductive material, is threaded into chamber 18 until it rests firmly on the seal 21, and an extension 12a thereof extends downwardly therefrom to protect the seal from direct impingement of fluids being controlled by the valve. A bevelled edge of extension 12a sealingly contacts the O-ring seal to further reduce the possibility of leakage between the bushing 12 and the housing 11 and to more securely hold the O-ring in its position on shoulder 18b.

Bushing 12 includes a cylindrical upstanding portion 12d having a bore 12e extending thereinto. A sleeve 23, of electrically non-conductive material serves as a liner for the inside wall of portion 12d and a shading ring 24 of electrically non-conductive material is set into a groove provided therefor in the end of the upstanding portion 12d.

A bell spring 25, of generally dish shape, positioned within the bore 12e, to act against the end thereof and against one end 13a of plunger 13, the other end 13b of which is shaped to serve as a valve head and to engage and compress the O-ring valve seat 21 and effectively close the vertical passage 17.

A slot 13c is formed in one side of the plunger 13, extends from the end 13a of the plunger to a point spaced from but adjacent to end 13b, so that no matter what the position of the plunger is it will always provide communication between chamber 18 and the bore 12e, between the end of bore and the end of the plunger. Thus, air will not be compressed between the end of the bore and the end of the plunger and the plunger will be able to reciprocate freely.

The solenoid 14, including an exterior housing 14a and windings 14b, is cylindrically shaped and surrounds the upstanding portion of the bushing 12. The retainer nut 14 is threaded onto the upper end of the upstanding portion of bushing 12, which is exteriorly threaded for the purpose, and holds the solenoid in place. Lead wires 14c to the solenoid are connected into an extension 14d of housing 14a.

The valve of the invention is relatively simple to manufacture, since it has no hidden surfaces to be machined. The valve seat accommodates irregularities in the valve head, so precise machining is not required of the plunger and valve head. A minimum number of parts are employed.

Fluid entering through inlet port will be blocked by the valve head portion of the valve plunger when the valve is closed and the resilient valve seat and seal will not be subjected to the impinging action of the fluid.

When the valve is opened, the fluid still impinges on the valve head and is then deflected to the ports 20. Depending portion 12a shields the seal 21 against impinging of the fluid thereon, but some of the fluid will contact the valve seat 13d as it flows thereover. However, the flow does not act on the O-ring 21 with great force since the force is largely dissipated by the contact made with the valve head.

If it is desired to change the spring biasing force, it is a simple matter to remove nut 15 and the solenoid 14, to turn the bushing until it moves out of chamber 18, remove the plunger from the bushing and to change springs, or to supply one or more additional springs that will provide an added spring bias.

In operation, the plunger 13 is normally biased downward by the spring 25 so that the valve head rests on O-ring seat 21 and blocks flow upwardly through passage 17.

Energizing of solenoid 14 retracts the plunger and allows flow from port 16 and passage 17 into chamber 18 and out the passages 20 and bore 19.

The shading ring prevents sticking open of the plunger and valve head and spring 25 provides a constant bias that will prevent valve chatter.

I claim:
1. A solenoid valve comprising
a housing having an open chamber formed in the upper end thereof, an inlet port and an outlet port, an upwardly extending inlet passage connecting to inlet port and the chamber and at least one upwardly extending discharge passage connecting the outlet port and the chamber, said discharge passage being spaced from the inlet passage;
a resilient O-ring valve seat recessed in the chamber, around the end of the inlet passage and between the inlet passage and the discharge passage;
a shoulder in the chamber surrounding the inlet and discharge passages;
a resilient O-ring seal on the shoulder;
a bushing of electrically conductive material, including an upstanding portion having a bore therein and means for positioning said bushing in the chamber to close the chamber and to engage the O-ring seal, whereby a seal is provided between the bushing and the housing, and the bore is arranged to open into the chamber;
an electrically non-conductive sleeve in the bore of the bushing;
a shading ring in the inner end of the bore;
a plunger slidable within the sleeve, said plunger having a valve head formed on its end protruding from the bore of the bushing to cooperate with the O-ring valve seat;
a bell spring positioned in the bore of the bushing, between the inner end thereof and the other end of the plunger;
a solenoid, having electrical leads connected thereto, surrounding the upstanding portion of the bushing, above the housing; and
means for removably securing said solenoid in position.
2. A solenoid valve according to claim 1, wherein a portion of the housing in the chamber is upset to secure the O-ring valve seat in place.
3. A solenoid valve according to claim 1, wherein the bushing further includes an extension to shield the O-ring seal against impingement of fluid being controlled.
4. A solenoid valve according to claim 1, wherein the bushing is threaded into the housing.
5. A solenoid valve according to claim 1, wherein the means for removably securing the solenoid in position comprises a nut threaded onto the upstanding portion of the bushing.

References Cited

UNITED STATES PATENTS

| 3,235,223 | 2/1966 | Wintriss. |
| 3,064,936 | 11/1962 | Strauss. |

FOREIGN PATENTS

| 494,316 | 7/1953 | Canada. |
| 886,286 | 6/1943 | France. |
| 600,507 | 12/1959 | Italy. |

ARNOLD ROSENTHAL, Primary Examiner